(12) United States Patent
Iizuka et al.

(10) Patent No.: US 8,467,643 B2
(45) Date of Patent: Jun. 18, 2013

(54) OPTICAL DEVICE USING DOUBLE-GROOVE GRATING

(75) Inventors: Hideo Iizuka, Ann Arbor, MI (US); Nader Engheta, Berwyn, PA (US)

(73) Assignees: Toyota Motor Engineering & Mfg. North America, Inc., Erlanger, KY (US); Trustees of the University of Pennsylvania, Philadelphia, PA (US)

( * ) Notice: Subject to any disclaimer, the term of this patent is extended or adjusted under 35 U.S.C. 154(b) by 137 days.

(21) Appl. No.: 12/855,844

(22) Filed: Aug. 13, 2010

(65) Prior Publication Data
US 2012/0038987 A1  Feb. 16, 2012

(51) Int. Cl.
*G02B 5/18* (2006.01)
*G02B 6/34* (2006.01)

(52) U.S. Cl.
USPC .............................. 385/37; 359/575

(58) Field of Classification Search
USPC ............... 359/13, 566, 569, 572, 573, 630, 359/633, 575; 385/37
See application file for complete search history.

(56) References Cited

U.S. PATENT DOCUMENTS

| | | |
|---|---|---|
| 5,434,434 A | 7/1995 | Kasahara et al. |
| 2001/0026399 A1 | 10/2001 | Nakabayashi et al. |
| 2009/0190094 A1* | 7/2009 | Watanabe et al. ............ 351/211 |
| 2009/0245730 A1 | 10/2009 | Kleeman |
| 2009/0285528 A1 | 11/2009 | Chang et al. |

FOREIGN PATENT DOCUMENTS

| | | |
|---|---|---|
| WO | WO 2008073439 A2 * | 6/2008 |
| WO | WO 2008148927 A1 * | 12/2008 |

OTHER PUBLICATIONS

Juha Pietarinen, Tuomas Vallius, Double groove broadband gratings, Optics Express vol. 16, No. 18 (Sep. 1, 2008), pp. 13824-13829).*
Saarinen (Asymmetric beam deflection by doubly grooved binary gratings, Applied Optics vol. 33, No. 14, p. 2401-2405 [1995]).*
Laakkonen et al. (High efficiency diffractive incouplers for light guides, Proc. of SPIE vol. 6896, pp. 68960E-1-68960E-11 [2008]).*
M. S. Lee et al., "Wide-field-angle behavior of blazed-binary-gratings in the resonance domain", Opt. Lett., 25, 1690 (2000).
J. Feng et al., "Polarization beam splitter using a binary blazed grating coupler", Opt. Lett. 32, 1662 (2007).
P. Lalanne et al., "Design and fabrication of blazed binary diffractive elements with sampling periods smaller than the structural cutoff", J. Opt. Soc. Am. A., 16, 1143 (1999).
P. Lalanne et al., "Blazed binary subwavelength gratings with efficiencies larger than those of conventional echelette gratings", Opt. Lett., 23, 1081 (1998).
M. Collischon et al., "Binary blazed reflection gratings", Appl. Opt. 33 3572 (1994).

(Continued)

*Primary Examiner* — Stephone Allen
*Assistant Examiner* — Kimberly N Kakalec
(74) *Attorney, Agent, or Firm* — Young Basile Hanlon & MacFarlane PC; Christopher G. Darrow

(57) ABSTRACT

Optical devices using double-groove diffraction gratings having periodic sets of $TiO_2$ elements on one or more surfaces of an $SiO_2$ substrate are disclosed. First order components of incident polarized light coupled into the substrate are reflected so as to propagate through the substrate to terminus points where they either change direction for further propagation or exit the substrate. A windshield display system using the principles of the invention is disclosed.

6 Claims, 5 Drawing Sheets

OTHER PUBLICATIONS

H. Haidner et al., "Dielectric binary blazed gratings", Appl. Opt. 32, 4276 (1993).

L. Pajewski et al., "Design of a binary grating with subwavelength features that acts as a polarizing bean splitter", Appl. Opt. 40, 5898 (2001).

N. Lu et al., "Design of transmission blazed binary gratings for optical limiting with the form birefringence theory", Appl. Opt., 47, 3743 (2008).

Y. Wang et al. "Pitch variable blazed grating consisting of freestanding silicon beams", Opt. Express, 17, 4419 (2009).

* cited by examiner

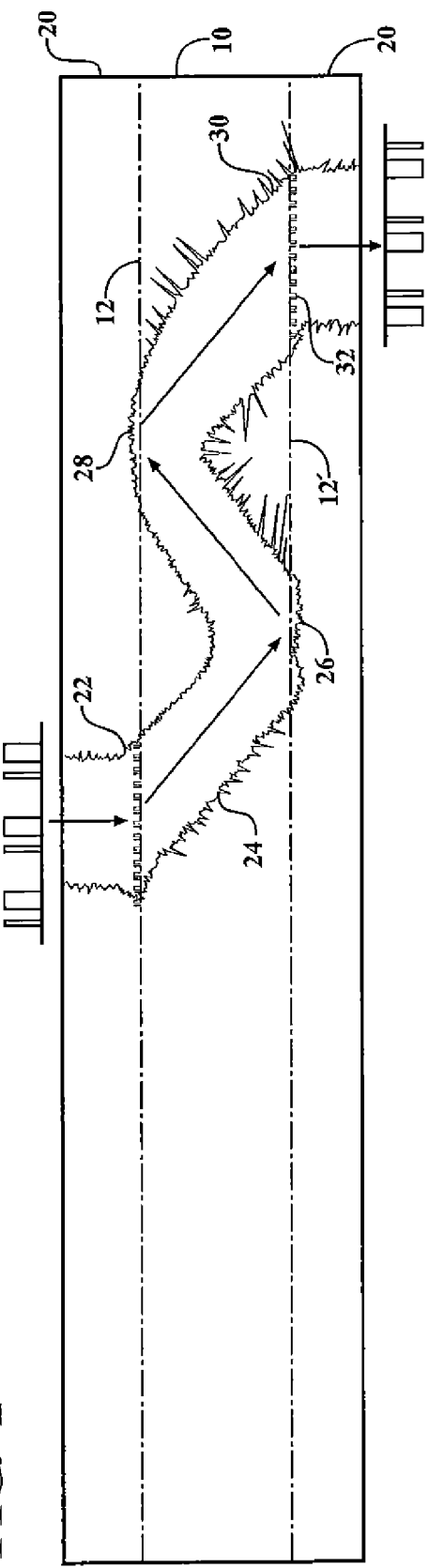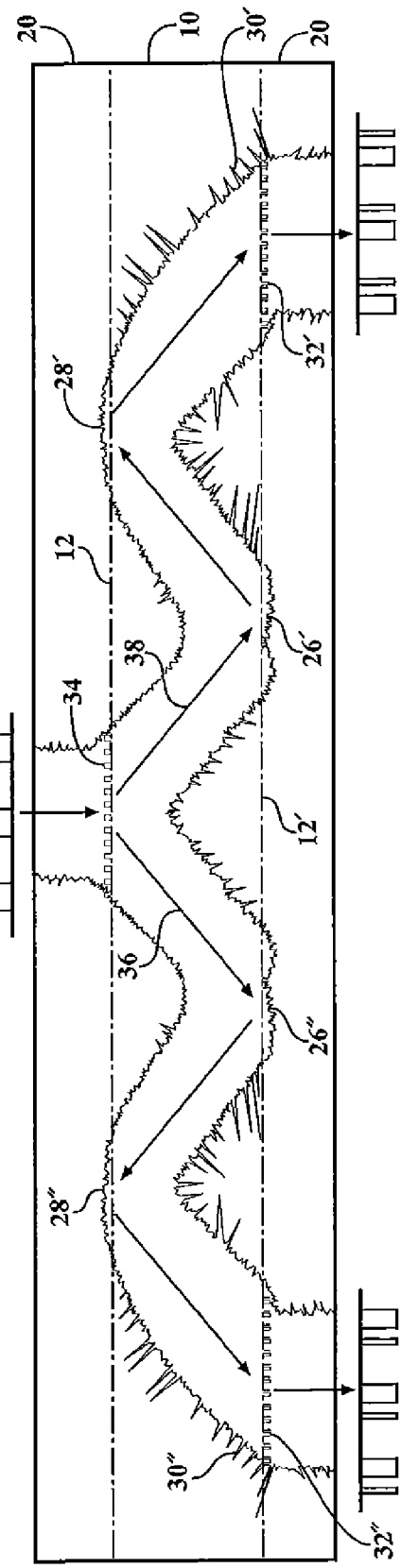

OPTICAL DEVICE USING DOUBLE-GROOVE GRATING

FIELD OF THE INVENTION

This invention relates to optical devices using double-groove diffraction gratings in association with a light transmissive substrate to control, couple, split, reflect and delay light from a coherent source such as a laser.

BACKGROUND OF THE INVENTION

In our application for U.S. patent Ser. No. 12/692,688, "Optical Device Using Diffraction Gratings", filed Jan. 25, 2010, we show how a single-groove diffraction grating with periodic elements of uniform width can be used to couple first order diffraction components of normal s-polarized incident light into a substrate at angles greater than the critical angle of the substrate boundary thereby to cause the refracted light to propagate through the substrate.

SUMMARY OF THE INVENTION

The present invention carries the technique of the above-identified pending patent application forward using double-groove diffraction gratings in combination with a light transmissive substrate for a variety of purposes involving manipulation of first order components of incident coherent light. The term "double-groove" is used herein to define a grating having periodic sets of grooves, each set having a wider groove and an adjacent narrower groove, the order being selected according to the desired optical effect. Such grating patterns are to be distinguished from "blazed" gratings in which gratings have three or more elements and the element dimensions vary gradually across a scale.

Before summarizing our invention, we find it useful to define a number of terms used in this description:
 (a) the term "entry area" refers to an area of a substrate where coherent light is incident upon a substrate surface and is coupled into the substrate primarily with respect to first order diffraction components; the entry area has a diffraction grating associated with it and that grating may be single or double-groove depending on whether both + and − first order components are to be coupled into the substrate;
 (b) the term "reflection point" is used to define a location where light propagating through the substrate encounters a boundary at an angle which is too shallow to normally allow escape; and
 (c) the term "terminus" refers to a location at a substrate boundary where light propagating through the substrate is either emitted from (exits) the substrate or reflected normally to an opposite boundary so that the direction of propagation can be reversed; a terminus is located at what would otherwise be a reflection point.

In accordance with our invention, an optical device is provided which comprises a light-transmitting substrate, such as $SiO_2$, having opposite sides contacted by a medium such as air with a lower refractive index. The substrate is provided with an entry area for incident, coherent light which is effective to couple at least one first order component into the substrate at an angle greater than the critical angle of the $SiO_2$/air boundary, and at least one terminus. The terminus is typically separated from the entry area by one or more reflection points.

For example, a light coupler can be designed wherein a double-groove diffraction grating of one sense is placed at the entry point, and another double-groove grating of opposite sense is spaced from the entry by multiple reflection points to define an exit terminus. The term "sense" is used to refer to the order in which the narrow and wide elements occur within a grating set.

As another example, a splitter for normal incident coherent light can be designed using a single groove diffraction grating at an entry point on one side of the substrate and double-groove diffraction gratings of opposite sense at laterally spaced apart emitting terminus points on the opposite side of the substrate, the spacing between the entry point and the two exit points being multiple reflection points apart such that the device operates as a light splitter.

In still another example, a light reflector can be designed wherein a double-groove diffraction grating serves as the light entry on one side of the substrate, a pair of directly opposite double-groove diffraction gratings of the same sense are spaced multiple reflection points apart from the entry point to reverse the direction of propagating light in the substrate, wherein the arrangement provides for unlimited propagation of light through the substrate.

As a still further example, a light delay device can be designed wherein multiple double-groove diffraction gratings are used to admit or couple incident light into the substrate, propagate it through multiple reflections, and then emit it from the substrate.

We also disclose herein a practical application of one embodiment of our invention to the creation of an image on the inside of an automotive windshield to convey important information to a driver.

BRIEF SUMMARY OF THE DRAWINGS

The description herein makes reference to the accompanying drawings wherein like reference numerals refer to like parts throughout the several views and wherein:

FIG. 2 is a side view of a light coupler employing the principles of the invention;

FIG. 3 is a side view of a light splitter incorporating the principles of the present invention;

DETAILED DESCRIPTION OF THE ILLUSTRATIVE EMBODIMENTS

Figure 1:
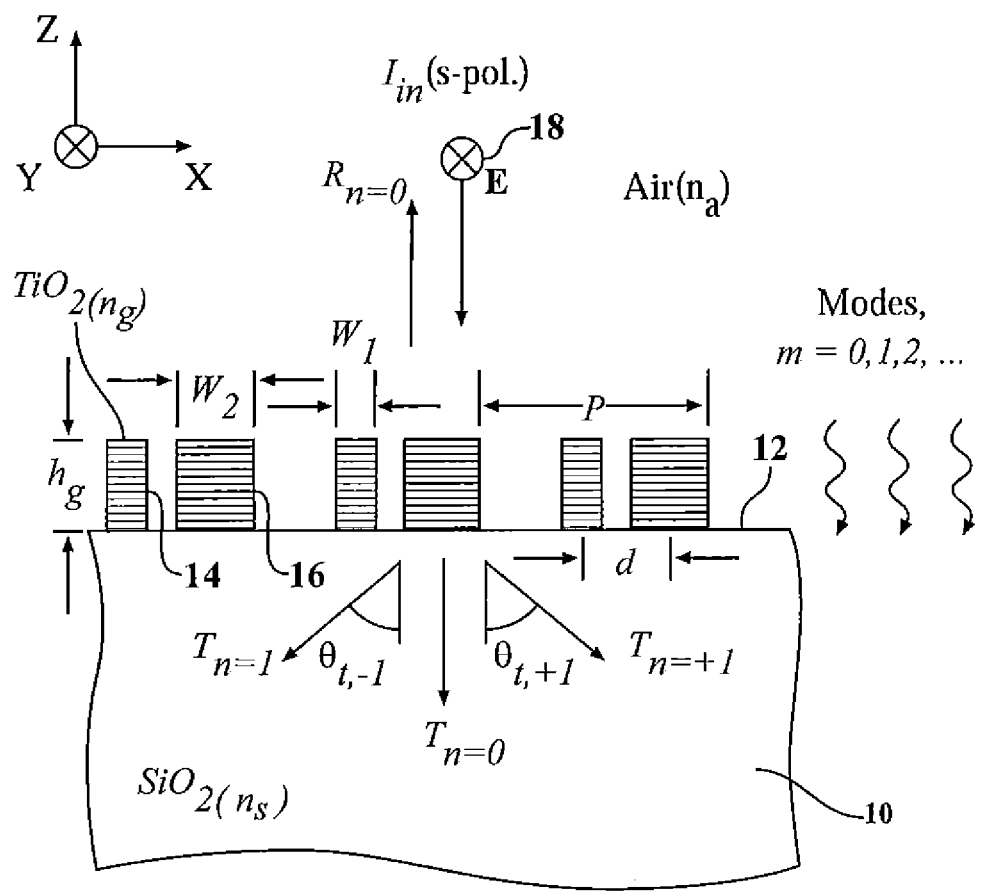
FIG. 1 is a diagram of a portion of substrate showing the details and parameters of a suitable single sense, double-groove diffraction grating according to our invention.

FIG. 1 illustrates a portion of an $SiO_2$ substrate 10 having a planar top side 12 and is used to illustrate and describe a "double-groove" refraction grating comprising periodically repeating sets of $TiO_2$ elements 14, 16 of two different widths arranged on the planar top side 12. The substrate 10 and the double-groove diffraction grating comprising sets of elements 14, 16 is immersed in air and is used to couple normal incident s-polarized coherent light 18 into the substrate in such a way as to primarily accept the positive first order component Tn=+1 and suppress all other components including a normal component Tn=0 and the negative first order component Tn=−1. While the substrate is shown to be planar and presumed to have a second side surface parallel to the side 12 shown and forming a refraction boundary, the invention is not limited to a flat substrate geometry.

In this illustrative example, the wavelength λ of the normal incident light 18 is 600 nm, the index of refraction $n_a$ of air is 1, the index of refraction $n_s$ of SiO₂ substrate is 1.45 and the period p of the double-groove diffraction grating is 540 nm. The element height $h_g$ is 280 nm. Using these parameters, the refraction angle of the coupled component Tn=+1, Θt+1 is 50° which is greater than the critical angle of an air/SiO₂ interface which is 43.6°. Because the 50° angle is greater than the critical angle, the coupled component will propagate through the substrate, reflecting off of the boundaries it encounters, unless a reflection point has a grating structure which qualifies it as a terminus. In the example of FIG. 1, the width $W_1$ of the TiO₂ elements 14 is 35 nm and the width $W_2$ of the wider adjacent elements 16 is 130 nm. The dimension d which is the center-to-center distance between adjacent elements is 170 nm. The index of refraction $n_g$ of TiO₂ elements is 2.38.

While FIG. 1, and the subsequent figures, all show the TiO₂ grating elements 14, 16 to be formed and located on an outside surface 12 of the substrate 10, those TiO₂ elements can also be recessed into the substrate so as to be flush with the surface 12 and/or an equivalent surface opposite surface 12, as hereinafter explained. As stated above, these surfaces need not be planar.

Looking now to FIG. 2, a light coupler is illustrated and hereinafter described. In this case, the substrate is again given the reference numeral 10 and is understood to comprise a body of SiO₂ having opposite parallel surfaces 12, 12'. The substrate is immersed in air which, in the figures, will be illustrated by imaginary elements 20 so as to form air/SiO₂ interfaces or boundaries on opposite sides of the substrate 10 for purposes to be described. A diffraction grating 22 incorporating the design illustrated in FIG. 1 is located at an "entry area" on a surface 12 approximately centrally of the substrate 10. Accordingly, the diffraction grating 22 operates to couple the 50° first order component of normal incident coherent light into the substrate 10 at an angle of 50° which is such as to establish three regularly and uniformly spaced reflection points 26, 28, 30 of which reflection points 26, 30 are on side 12' of the substrate 10 whereas the intermediate reflection point 28 is on the entry side 12 of the substrate 10. In this instance, a second double-groove diffraction grating 32 is located at the reflection point 30 so that it becomes a "terminus" for the propagating light component, allowing it to exit or be "emitted" from the substrate 20 normal to the surface 12' as illustrated in FIG. 2.

It will become clear in this written description that there are two types of termini, one terminus refracts light out of the substrate and, therefore, is an exit terminus like reflection point 30, whereas another type of terminus refracts light back into the substrate and, therefore, is an acute angle reflector hereinafter described with reference to FIG. 4.

It will be immediately apparent from FIG. 2 that the "sense"; i.e., the order in which the narrow and wide elements 14, 16 of the diffraction gratings 22, 32 appear is reversed as between the entry area 22 and the exit terminus 32. To be more specific, the sense or order of the elements 14, 16 in diffraction grating 22 is identical to that shown in FIG. 1 whereas the order, proceeding from left to right of the same elements in the exit grating 32, is the opposite. If one turns the structure of FIG. 2 upside-down, it will be seen that the diffraction grating 32 looks like the grating illustrated in FIG. 1.

In summary, the structure of FIG. 2 shows how incident coherent light can be coupled into a light transmissive substrate at a diffraction angle which is greater than the critical angle of the substrate interface boundaries so as to be propagated by repeated and periodic reflections within the substrate medium in a lateral direction. In theory, any direction point can serve as a terminus but, as in the case of FIG. 2, the most practical arrangement is for the terminus 30 to be on the opposite surface or side 12' of the substrate 10.

Referring now to FIG. 3, a second practical embodiment of the invention is illustrated. The substrate 10 is again SiO₂ and has opposite parallel surfaces 12, 12'. A diffraction grating 34 is formed at an entry area centrally of the substrate 10 to receive normal incident s-polarized light and split that light in such a way as to couple both + and − first order components 36, 38 into the substrate 10 at angles Θ of +50° and −50°; i.e., angles which are greater than the critical angle of the SiO₂/air interface at each of the boundaries represented by surfaces 12, 12'. In this case, the diffraction grating 34 is of a "single groove" design, which means that it has the TiO₂ elements 16 with a period of 540 nm, a width $W_2$ of 145 nm, and a height $h_g$ of 175 nm but has no secondary or narrower elements 14 as is the case for the double-groove diffraction gratings, shown in FIGS. 1 and 2.

The positive first order component 38 encounters the side surface boundaries 12, 12' at reflection points 26', 28', 30' whereas the negative first order component encounters reflection points 26", 28", 30". In this instance, the reflection points 32', 32" are "terminus" points and are equipped with double-groove diffraction gratings 32', 32" of opposite sense. Accordingly, each of the terminus reflection points 30', 30" are exit points allowing the propagating component which reaches them to exit normally to the surface 12' as illustrated in FIG. 3.

The apparatus shown in FIG. 3 is typically called a "light splitter" and may be used in a variety of ways, including the formation of a binocular output from a monocular input.

It will be understood that the number of reflection points between the entry and exit points as illustrated in FIG. 3 is arbitrary and that, in theory, it is possible for the terminus or exit points to be on the surface 12; i.e., the same side as the entry point.

Figure 4:
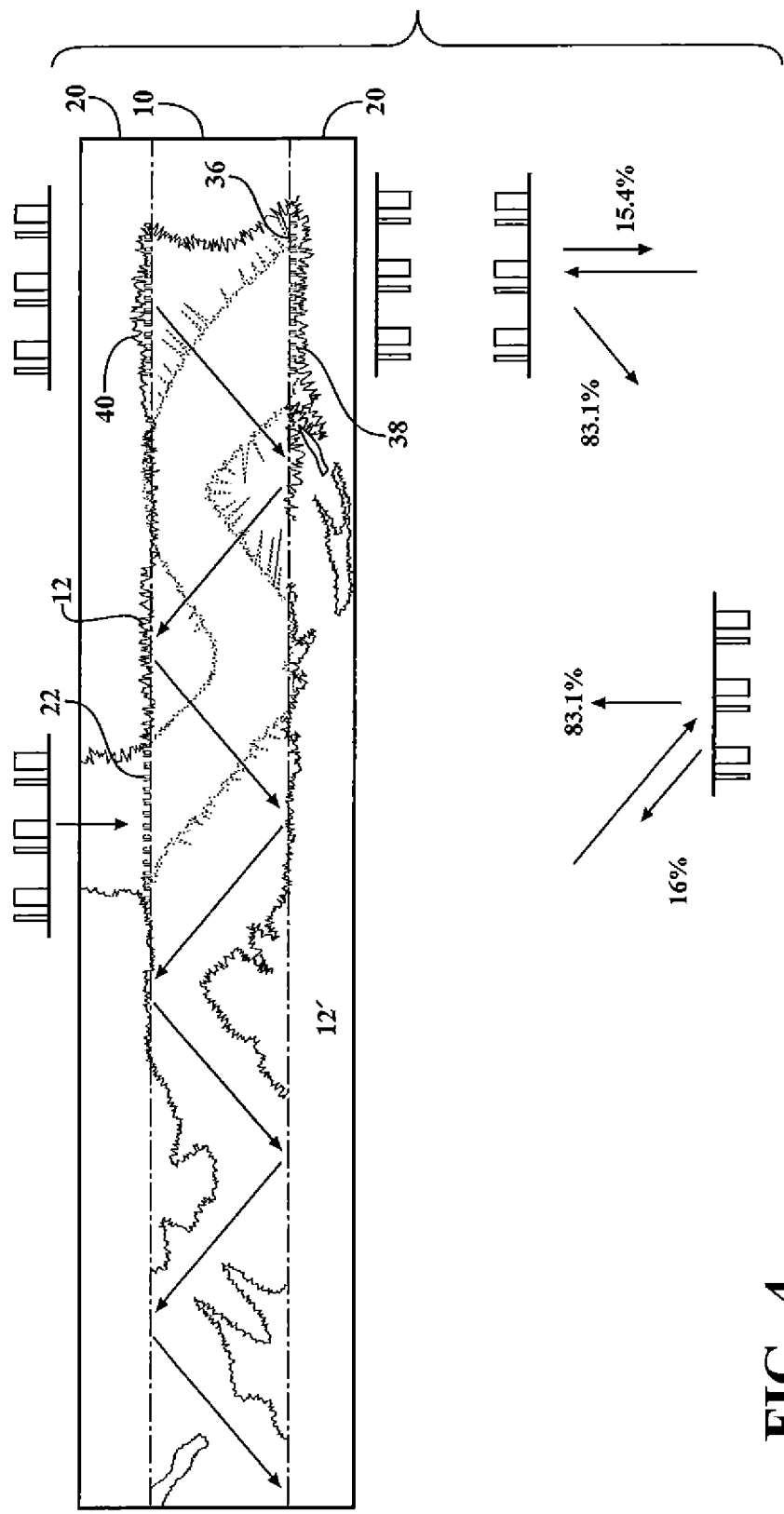
FIG. 4 is a side view of a light reflector employing the principles of the present invention.

Turning now to FIG. 4, the optical device there shown comprises the substrate 10 immersed in air represented by elements 20 to create boundaries or interfaces which are coextensive with the opposite parallel planar surfaces 12, 12'. A double-groove diffraction grating 22 is located on surface 12 approximately centrally from the substrate 10 in the fashion of FIGS. 1 and 2 to couple the first order component of normal incident light into the substrate 10 at an angle of 50° such that it propagates by reflection from side 12' back to side 12 and so on until it reaches a terminus 36 on side 12' having a double-grooved diffraction grating 38 with the elements 14, 16 arranged in the same sense as the elements of the entry grating 22 when viewed with FIG. 4 in an upright orientation. As a consequence of this sense, the reflected propagating light component does not exit at the reflection/terminus 36 but is reflected normally back up through the substrate to another double-grooved diffraction grating 40 arranged on surface directly opposite the diffraction grating 38. The grating 40 thus returns the propagating component into the substrate 10 at the 50° angle which is greater than the critical angle 43.6° of the SiO₂ air/interface boundaries coextensive with sides 12, 12'. The component thus propagates from side 12 to side 12' and back again indefinitely traveling from left to right through the substrate 10 as far as is desired. This is a "light reflector" wherein light remains entirely within the substrate even though the gratings are formed on the outside of the substrate. Calculations indicate that the component which is reflected from grating 38 to grating 40 is approximately 83.1% of the inbound light and that only about 16% is reflected back along the input path. Similarly, the efficiency of the grating 40 is approximately 83.1%, whereas approximately 15.4% of the light encountering the grating 40 is reflected back toward grating 38.

Figure 5:
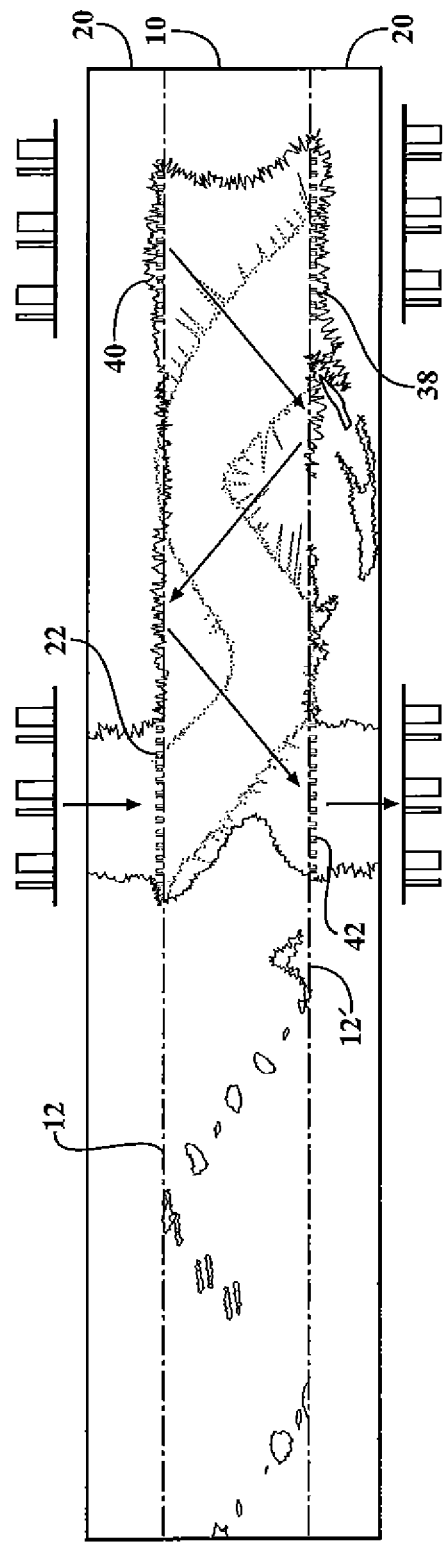
FIG. 5 is a side view of a light delay device incorporating the principles of the present invention.

Referring now to FIG. 5, the device there illustrated is identical to the light reflector of FIG. 4 with same sense double-grooved gratings 38, 40 located at respective termini on the surfaces 12', 12 to the right of the entry point 22. However a fourth grating 42 is located at a reflection point/terminus on side 12' directly under the entry point grating 22 so as to serve as a terminus which allows the propagating component to exit the substrate 10. Note that in FIG. 5, the senses of all of the double-grooved diffraction gratings 22, 40, 38, 42 are the same when viewed with the figure in one orientation.

The gratings in FIGS. 1 through 5 have rectangular shaped elements. Those gratings are sometimes referred to as "rectangular gratings" or "binary gratings". The present invention is not limited to the rectangular or "binary" shape. The gratings can have triangular shaped elements as well as elements of other shapes. Other applications of the present invention will become apparent to those skilled in the art when the following description of the best mode contemplated for practicing the invention is read in conjunction with the accompanying drawings.

Figure 6:
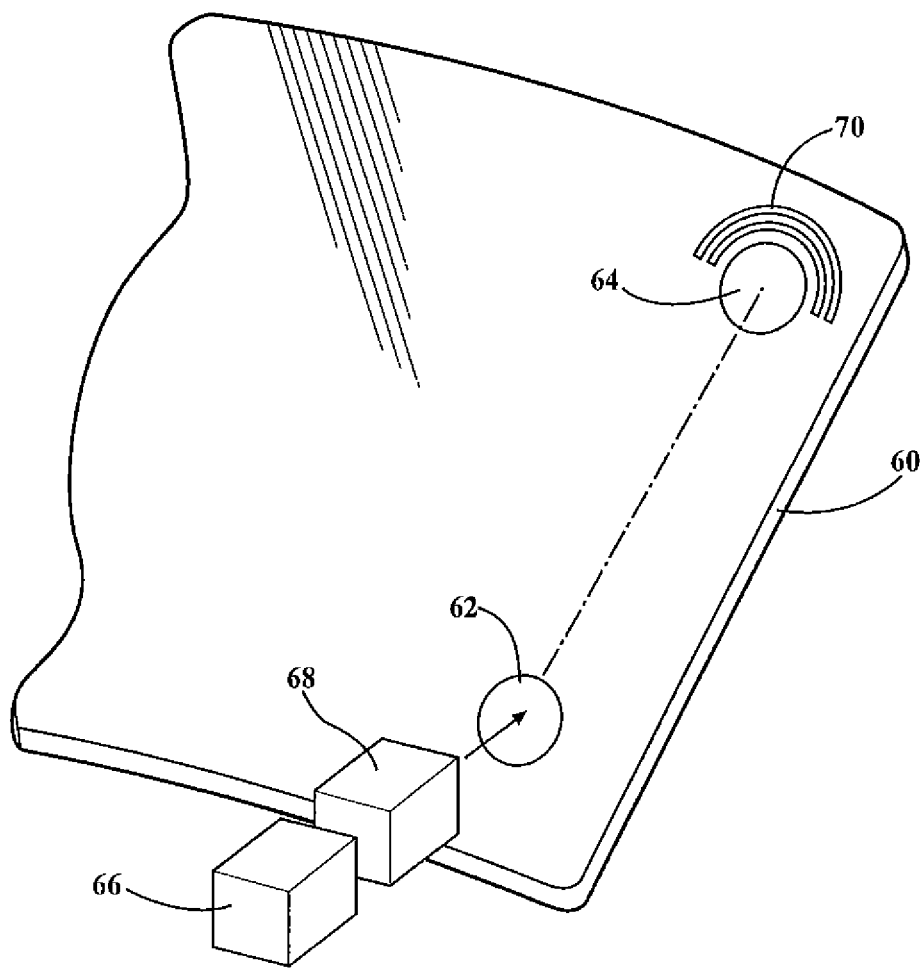
FIG. 6 is a perspective view of a windshield display system using the optical device of FIG. 2.

FIG. 6 illustrates a practical application of the coupler of FIG. 2 to an automotive display system. In this example, the automobile windshield 60 corresponds to the substrate 10 of FIG. 2, spot 62 low on the windshield corresponds to the "entry area" 22, and spot 64 higher on the windshield corresponds to "terminus" 32. A transducer 66 generates a signal related to the operation of the automobile engine (not shown); for example low oil pressure. This signal is connected to a laser imager 68 which outputs an image saying "low oil pressure" and projects that image onto the exterior surface of the windshield below the normal line of sight. The entry area 62 is equipped with a grating as described with reference to FIG. 2 which directs the image in such a way as to propagate through the windshield glass to terminus 64 where it exits the windshield substrate to appear to the driver. A curved, double-groove grating 70 may be used to prevent reflection. This system is much more likely to gain the driver's immediate attention to the critical engine condition than a conventional instrument panel indicator.

It will be apparent to those skilled in the art that while the invention has been described with respect to specific and illustrative practical embodiments thereof, and that specific design parameters have been given for purposes of illustration, the primary points are that the component or components of normal incident coherent light which are coupled into the substrate are diffracted or bent through an angle which is greater than the critical angle of the substrate/medium interface which exists on each of the opposite sides of the substrate thus causing the coupled component or components to propagate by reflection through the substrate.

What is claimed is:

1. A device for the low-loss transmission of a first order component of polarized coherent light incident thereon comprising:
    a substrate of a first material having a first refraction index, said substrate having first and second opposite parallel sides;
    a first grating associated with one of said sides and comprising periodically arranged elements of a dielectric material having a second refraction index different from the first refraction index, said elements comprising periodic sets of spaced-apart wide and narrow elements of uniform depth and arranged in a first order of occurrence to couple a first order component of said incident light into said substrate at an angle which produces reflections of the coupled component within the substrate and to suppress all other components of said incident coherent light; and
    a second grating associated with one of said sides and located to receive a reflection of a coupled component thereon from within said substrate, said second grating comprising periodically arranged elements of said dielectric material, said elements being arranged in periodic sets of spaced-apart wide and narrow elements of uniform depth in a second order of occurrence which is opposite of the first order of occurrence and generally parallel to the elements of the first grating to cause the coupled first order component of incident light to exit the substrate.

2. A device as defined in claim 1 wherein the elements are of a depth of about 0.47 $\lambda$ where $\lambda$ is the wavelength of said incident light.

3. A device as defined in claim 2 wherein the elements of the first and second gratings are substantially rectangular.

4. A coupler device as defined in claim 1 wherein the substrate in $SiO_2$, the dielectric grating elements are $TiO_2$ and the medium surrounding the device is air.

5. A device as defined in claim 1 wherein the first and second gratings are on opposite sides of the substrate.

6. A device as defined in claim 1 wherein the first and second gratings are laterally shifted from one another.

* * * * *